(12) United States Patent
Narasimhan et al.

(10) Patent No.: US 10,318,278 B2
(45) Date of Patent: Jun. 11, 2019

(54) POWER MANAGEMENT DATA PACKAGE PROVISION METHOD AND APPARATUS

(71) Applicant: INTEL CORPORATION, Santa Clara, CA (US)

(72) Inventors: Krishnakumar Narasimhan, Hillsboro, OR (US); Nicholas J. Adams, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 14/850,733

(22) Filed: Sep. 10, 2015

(65) Prior Publication Data

US 2017/0075682 A1 Mar. 16, 2017

(51) Int. Cl.
*G06F 9/24* (2006.01)
*G06F 15/177* (2006.01)
*G06F 8/654* (2018.01)

(52) U.S. Cl.
CPC .................... *G06F 8/654* (2018.02)

(58) Field of Classification Search
None
See application file for complete search history.

(56) References Cited

U.S. PATENT DOCUMENTS

2015/0338896 A1* 11/2015 Khatri .................. G06F 1/324
713/320
2016/0132085 A1* 5/2016 Baysah .................. G06F 1/206
713/300

* cited by examiner

*Primary Examiner* — Nitin C Patel
(74) *Attorney, Agent, or Firm* — Schwabe, Williamson & Wyatt, P.C.

(57) ABSTRACT

Apparatuses, methods and storage medium associated with provision of power management data packages are disclosed herein. In embodiments, an apparatus may include one or more processors, memory to store a power management data package having a first plurality of descriptions of always present fixed platform devices and a second plurality of descriptions of potentially present variable platform devices; and firmware coupled with the one or more processors and memory to provide basic input/output services to an operating system operated by the one or more processors, wherein the operating system has an operational requirement for the power management data package. The basic input/output services may include a service to modify the power management data package to bring the power management data package into compliance with the operational requirement of the operating system. Other embodiments may be described and/or claimed.

25 Claims, 7 Drawing Sheets

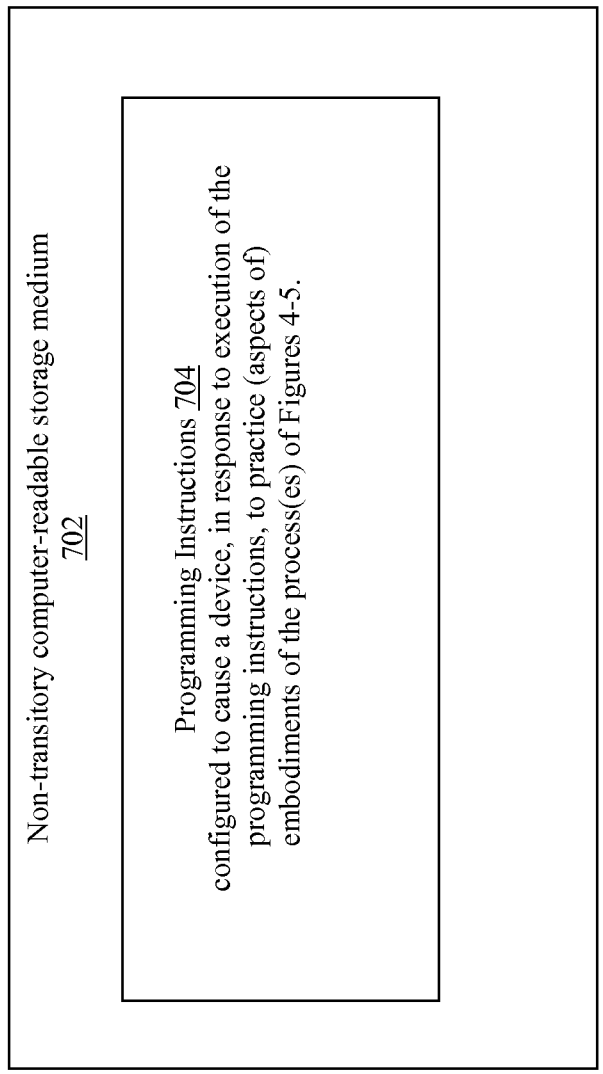

POWER MANAGEMENT DATA PACKAGE PROVISION METHOD AND APPARATUS

TECHNICAL FIELD

The present disclosure relates to the field of computing. More particularly, the present disclosure relates to the provision of power management data package.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In computing, the Advanced Configuration and Power Interface (ACPI) is an industry specification that provides for an open standard for device configuration and power management by the operating system. Current implementations of ACPI compliant operating systems (OS), such as Windows 8.1 from Microsoft® Corporation of Redmond, Wash., impose restrictions on the size of certain types of inputs, specifically ACPI Packages. With the growing complexity of computing platforms and the number of platforms that must be supported by a single firmware/basic input/output service (FW/BIOS) image, this limitation is creating new challenges. For further information on ACPI, see ACPI Specification 5.0, published Dec. 6, 2011, available from the ACPI Consortium.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates a storage medium having instructions for practicing methods described with references to FIGS. 4-5, according to various embodiments.

DETAILED DESCRIPTION

Figure 1:
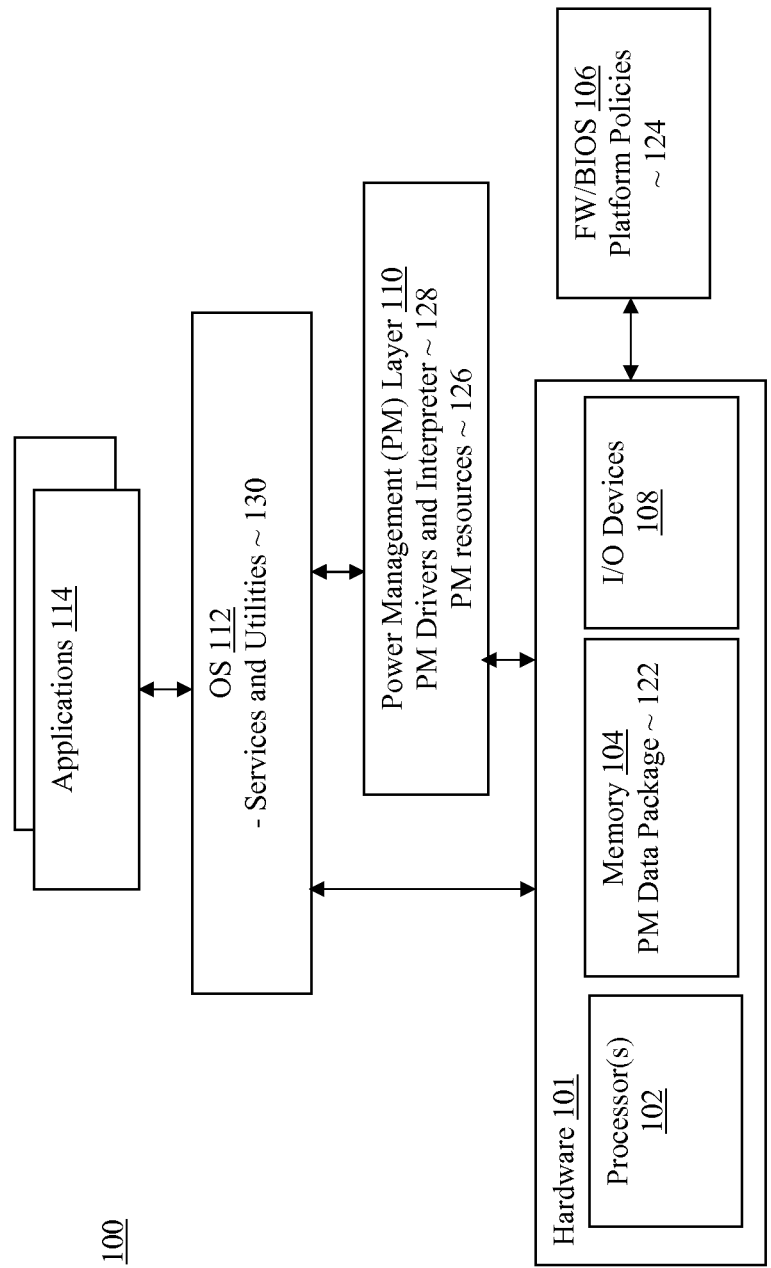
FIG. 1 illustrates a computing device having the power management data package provision technology of the present disclosure, according to various embodiments.

Apparatuses, methods and storage medium associated with provision of power management data packages are disclosed herein. In embodiments, an apparatus may include one or more processors, memory to store a power management data package having a first plurality of descriptions of always present fixed platform devices and a second plurality of descriptions of potentially present variable platform devices; and firmware coupled with the one or more processors and memory to provide basic input/output services to an operating system operated by the one or more processors, wherein the operating system has an operational requirement for the power management data package. The basic input/output services may include a service to modify the power management data package to bring the power management data package into compliance with the operational requirement of the operating system.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a computing device having the power management package provision technology of the present disclosure, according to various embodiments, is shown. As illustrated, computing device 100 may include hardware 101 and FW/BIOS 106, power management (PM) layer 110, OS 112 and applications 114, operatively coupled with each other as shown. OS 112 may have one or more operational requirements for PM data package 122, such as, its size. To enable support for a large number of platforms with different combinations of platform devices, FW/BIOS 106 may be configured with a service to modify PM data package 122, to bring PM data package 122 in compliance with the operational requirement, such as its size limit, before providing PM data package 122 to OS 112. An example of PM data package 122 may be an ACPI device constraint package. FW/BIOS 106, in particular, the service to modify PM data package 122 will be further described below with references to FIGS. 2-5.

In embodiments, hardware 101 may include one or more processors 102, memory 104, and I/O devices 108. In alternate embodiments, hardware 101 may also include other hardware elements. Each of processors 102 may be any one of a number of processors known in the art, having one or more processor cores. Likewise, memory 104 may be any known volatile or non-volatile memory in the art, suitable for storing data, in particular, PM data package 122. Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

FW/BIOS 106 may be configured to provide a number of services to OS 112, such as power on self test (POST), and the earlier mentioned service for modifying PM data package 122 to ensure it complies with the operational requirement of OS 112, before providing to OS 112. Additionally, FW/BIOS 106 may be configured with one or more platform policies 124, in particular, a platform policy 124 that specifies the platform devices on a particular platform. In embodiments, as alluded to earlier, to enable support for a large number of platforms with different combinations of platform devices, PM data package 122 may initially include descriptions of a number of fixed platform devices that are always present in any supported computing platform, and descriptions of a large number of variable platform devices that potentially may be present in a platform. For these embodiments, FW/BIOS 106 may be configured to modify PM data package 122, based at least in part on platform policies 124, in particular, the platform policy 124 that specifies the platform devices on the platform, before providing PM data package 122 to OS 112.

PM Layer 110 may include one or more PM drivers and an interpreter 128 and various PM resources 126 to service OS 112 and manage power states of various elements of hardware 101, such as processors 102, memory 104, I/O devices 108, and so forth. PM drivers and interpreter 128 may be invoked by OS 112 to service/process various power management commands, such as, but not limited to, commands to power up a hardware element, commands to place a hardware element in a low power consumption state, commands to power off a hardware element and so forth. PM resources 126 may include registers, tables and so forth available for use by PM drivers and interpreter 128. An example of PM Layer 110 may be ACPI.

OS 112 may include various services and utilities 130 for applications 114, including power management services for managing power states of the platform. OS 112 may be any one of a number of OS known in the art, e.g., Windows 8.1 from Microsoft® Corporation. Applications 114 may be any one of a number of applications known in the art.

Note that while for ease of understanding, FW/BIOS 106, PM layer 110, OS 112 and applications 114 are illustrated as separate blocks from hardware 101 (which includes memory 104), to clearly distinguish between software and hardware elements of apparatus 100, those skilled in the art will appreciate that in operation, FW/BIOS 106, PM layer 110, OS 112 and/or applications 114 are typically loaded into and executed from memory 104.

Figure 2:
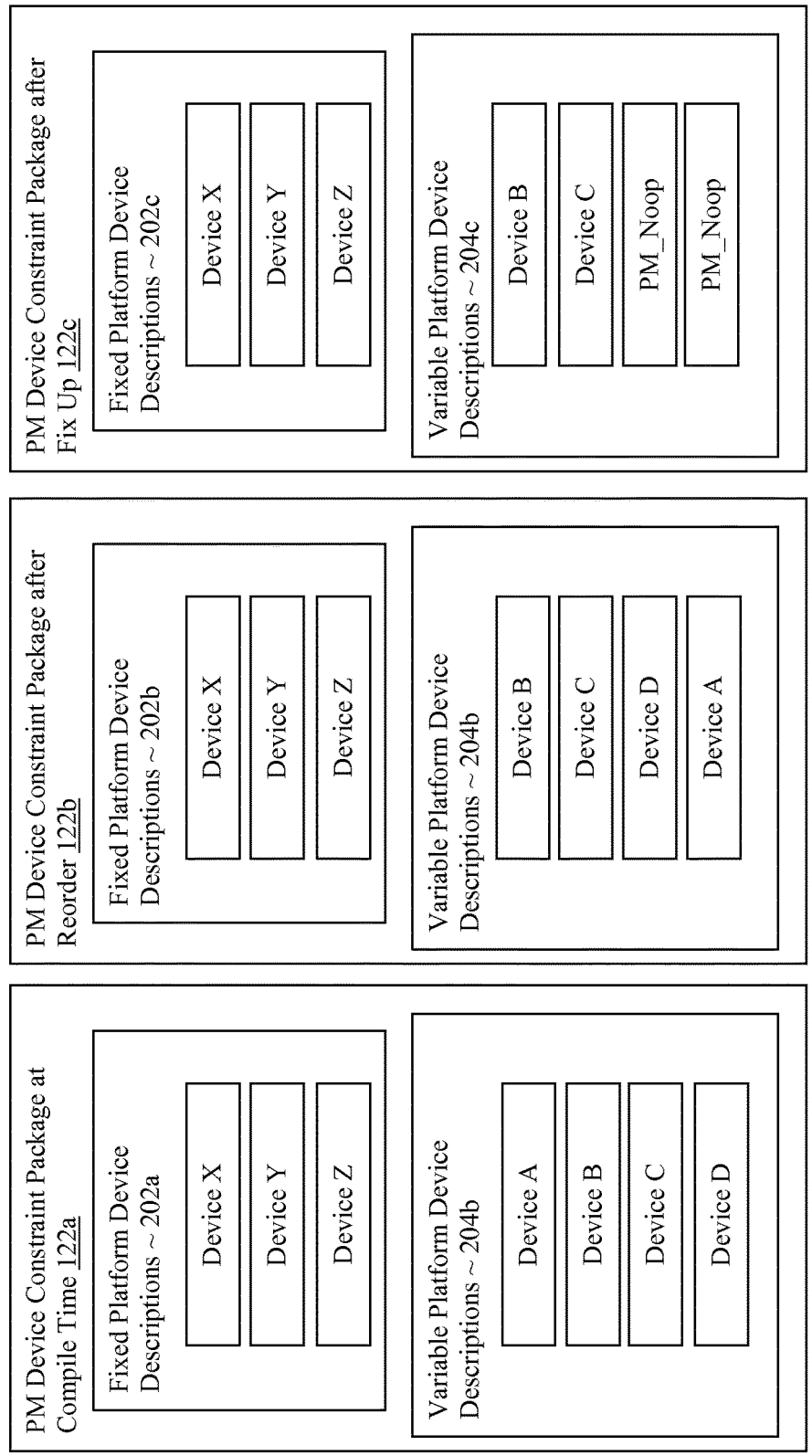
FIGS. 2 and 3 illustrate an example provision of a power management data package, according to various embodiments.
Figure 3:
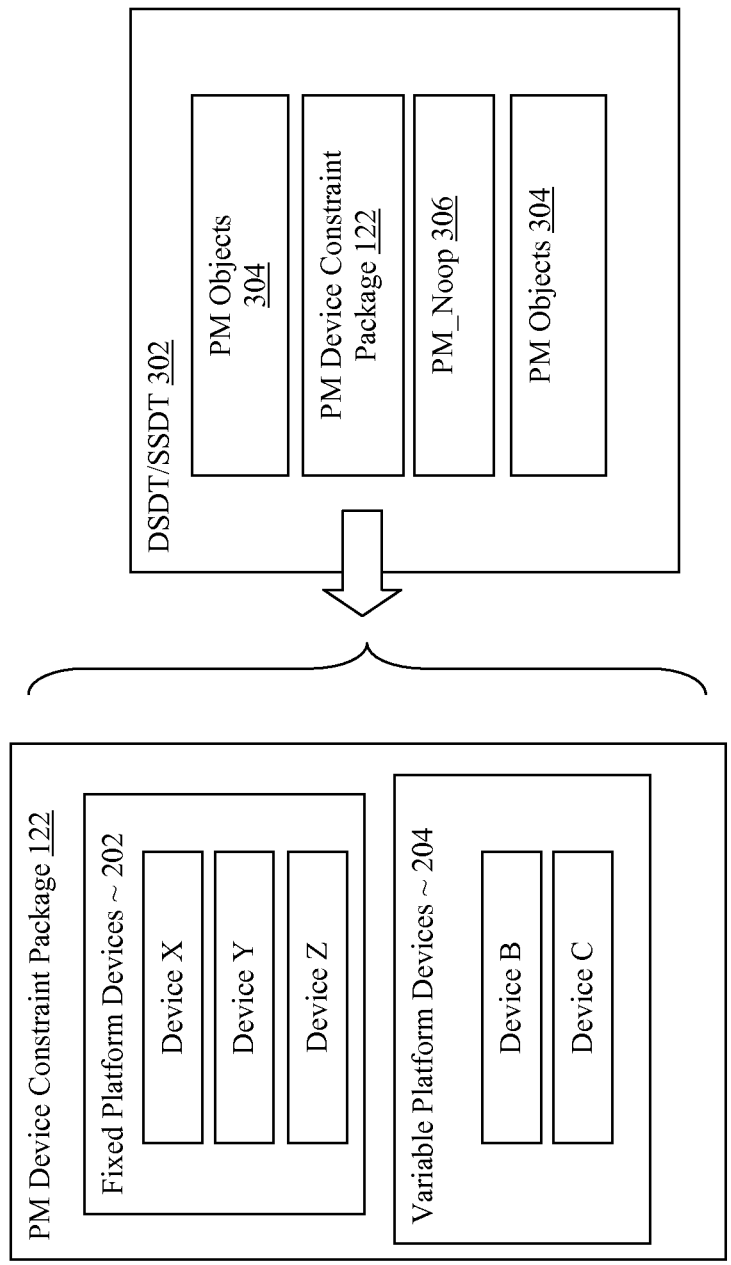

Referring now to FIGS. 2 and 3 wherein an example provision of a PM data package, according to various embodiments, is illustrated. More specifically, FIGS. 2 and 3 illustrate an example provision of a PM device constraint package, such as the ACPI device constraint package. As shown, at compiled PM device constraint package 122a may include descriptions 202a of a number fixed platform devices, e.g., devices x, y and z that are always present in all supported platforms, followed by descriptions 202b of a large number variable platform devices that are potentially present in any particular platform, e.g., devices A, B, C, D.

As shown in the middle section of FIG. 2, prior to providing PM device constraint package 122a to OS 112, FM/BIOS 106 would reorder variable platform device descriptions 204b, to form PM device contain package 122b. In particular, FM/BIOS 106 would reorder descriptions 204b of variable platform devices that are actually present, e.g., devices B and C, ahead of the variable platform devices that are not present, e.g., devices D and A. As described earlier, FM/BIOS 106 may determine which of the variable platform devices are actually present, in accordance with one of the platform policies 124 that specify variable platform devices on a platform.

In embodiments, after reorder, FM/BIOS 106 may be configured to further replace descriptions 204c of variable platform devices that are not present in a particular platform with a PM Noop opcode. The PM Noop opcodes 306, together with PM device constraint package 122 and PM objects 304, enable embodiments to maintain sizes of certain PM tables 302, such as Differentiated System Description Table (DSDT) and/or System Service Description Table (SSDT) 302 of ACPI, as shown in FIG. 3.

In embodiments, FM/BIOS 106 may be configured to recalculate the size of PM device constraint package 122 after it has been reordered, and the descriptions of the not present variable platform devices have been replaced with the PM Noop opcode. On recalculation, FM/BIOS 106 may update the header (not shown) of PM device constraint package 122 with the size, and the actual number of fixed and variable platform devices present in the platform.

Figure 4:
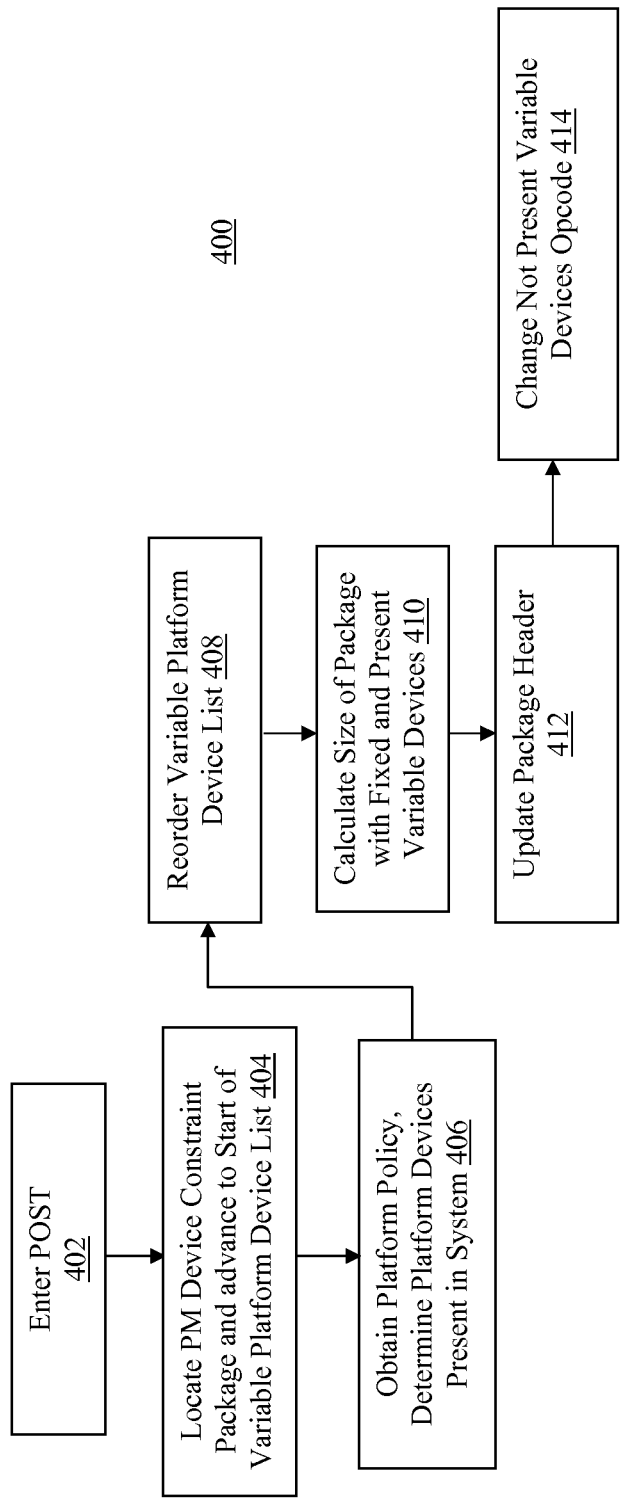
FIG. 4 illustrates an example process for providing a power management data package, according to the various embodiments.

Referring now FIG. 4, wherein an example process for providing a power management data package, according to the various embodiments, is shown. As shown, process 400 for providing a power management data package may include operations at blocks 402-414. The operations may be performed e.g., by FM/BIOS 106.

Process 400 may start at block 402. At block 402, a power on self test (POST) may be initiated on system power up or reset.

At block 404, the PM device constraint package may be located, including the starting point of the descriptions of the variable platform devices that are potentially present in a platform.

At block 406, a platform policy that specifies the platform devices that are actually present may be located.

At block 408, the order of the variable platform devices may be re-ordered with the not present variable platform devices moved to follow the actually present variable platform devices.

At block 410, the size of the PM device constraint package having only the fixed and actually present variable platform devices (but not the not present variable platform devices) may be calculated.

At block 412, the header of the PM device constraint package may be updated with the re-calculated size, and the number of platform devices that are actually present.

At block 414, the descriptions of the variable platform devices that are not present may be replaced with PM Noop opcode.

Figure 5:
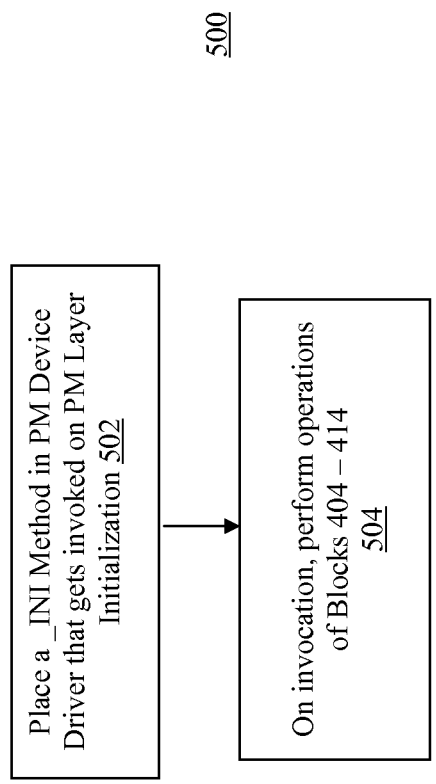
FIG. 5 illustrates another example process for providing a power management data package, according to various embodiments.

Referring now to FIG. 5, wherein another example process for providing a power management package, according to various embodiments, is shown. As illustrated, process 500 may include operations performed at blocks 502-504. The operations at block 502 may be performed during runtime, and the operations at block 504 may likewise be performed by FM/BIOS 106. Unlike process 400 where FM/BIOS 106 performs the operations at blocks 404-414 as part of POST, the embodiment of FIG. 5, as shown in block 502, assumes an initialization method (_INI Method) is placed in a PM Driver that gets invoked at the beginning when PM layer 110 initializes itself during power on or reset. Thus, this PM driver will invoke the _INI method and cause the operations at block 504 to be performed during initialization of PM layer 110. The operations at block 504 include performance of the earlier described operations at blocks 404-414 of FIG. 4.

Figure 6:
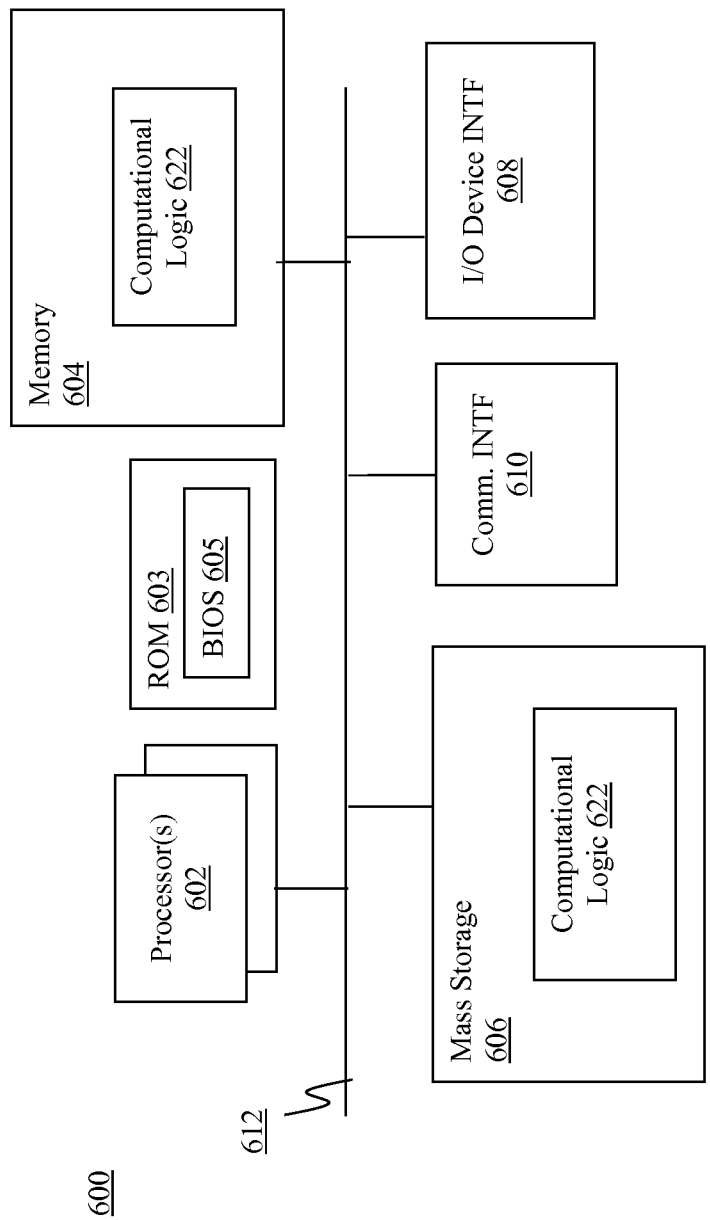
FIG. 6 illustrates an example computer system suitable for use to practice aspects of the present disclosure, according to various embodiments.

FIG. 6 illustrates an example computer system that may be suitable for use to practice selected aspects of the present disclosure. As shown, computer 600 may include one or more processors or processor cores 602, read-only memory (ROM) 603, and system memory 604. For the purpose of this application, including the claims, the term "processor" refers to a physical processor, and the terms "processors" and "processor cores" may be considered synonymous, unless the context clearly requires otherwise. Additionally, computer system 600 may include mass storage devices 606. Example of mass storage devices 606 may include, but are not limited to, tape drives, hard drives, compact disc read-only memory (CD-ROM) and so forth). Further, computer system 600 may include input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, ROM 603 may include basic input/output system services (BIOS) 605, including the PM data package provision service, as earlier described. System memory 604 and mass storage devices 606 may be employed to store a working copy and a permanent copy of the programming instructions implementing the operations associated with applications 112 and guest OS 114, as earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer system 600 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 610-612 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to implement (aspects of) FM/BIOS 106, OS 112, and/or applications 114. In alternate embodiments, programming instructions 704 may be disposed on multiple computer-readable non-transitory storage media 702 instead. In still other embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having aspects of FM/BIOS 106 and/or OS 112. For one embodiment, at least one of processors 602 may be packaged together with memory having aspects of FM/BIOS 106 and/or OS 112 to form a System in Package (SiP). For one embodiment, at least one of processors 602 may be integrated on the same die with memory having aspects of FM/BIOS 106 and/or OS 112. For one embodiment, at least one of processors 602 may be packaged together with memory having aspects of FM/BIOS 106 and/or OS 112 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for computing, comprising: one or more processors; memory to store a power management data package having a first plurality of descriptions of always present fixed platform devices and a second plurality of descriptions of potentially present variable platform devices; and firmware coupled with the one or more processors and memory to provide basic input/output services to an operating system operated by the one or more processors, wherein the operating system has an operational requirement for the power management data package. Further, the basic input/output services may include a service to modify the power management data package to bring the power management data package into compliance with the operational requirement of the operating system.

Example 2 may be example 1, wherein the operational requirement for power management data packages may comprise an upper size limit for the power management data packages.

Example 3 may be example 1, wherein to modify the power management data package may comprise to determine which of the potentially present variable platform devices are actually present and which of the potentially present variable platform devices are not present, in accordance with one or more platform policies.

Example 4 may be example 3, wherein to modify the power management data package may further comprise to re-arrange the second plurality of descriptions, such that a first actually present subset of the second plurality of descriptions of the potentially present variable platform devices precedes a second not present subset of the second plurality of descriptions of the potentially present variable platform devices.

Example 5 may be example 4, wherein to modify the power management data package may further comprise to calculate a size of the power management data package that includes only the first plurality of descriptions of the always present fixed platform devices, and the first actually present subset of the second plurality of descriptions of the potentially present variable platform devices.

Example 6 may be example 5, wherein to modify the power management data package may further comprise to update a header of the power management data package with the calculated size.

Example 7 may be example 6, wherein to modify the power management data package may further comprise to replace each of the second not present subset of the second plurality of descriptions of the potentially present variable platform devices with a noop opcode.

Example 8 may be any one of examples 1-7, wherein the basic input/output services of the firmware may perform the service to modify the power management data package during power on self-test, before the power management data package is provided to the operating system.

Example 9 may be any one of examples 1-7, further comprising a power management service layer to be operated by the processor to manage power states of various components of the apparatus, wherein the power management service layer may include a power management object having a method that invokes the service of the basic input/output services to modify the power management data package during initialization of the power management service layer, before the power management data package is provided to the operating system.

Example 10 may be example 8, wherein the apparatus may be a selected one of a smartphone, a computing tablet, a notebook computer, a laptop computer, an e-book, a game console, a set-top box, or a server.

Example 11 may be a method for computing, comprising: storing, by a computing device, a power management data package having a first plurality of descriptions of always present fixed platform devices and a second plurality of descriptions of potentially present variable platform devices, into memory of the computing device; modifying, by firmware of the computing device, the power management data package to bring the power management data package into compliance with an operational requirement of an operating system of the computing device; and after the modifying, providing, by the computing device, the power management data package for use by the operating system.

Example 12 may be example 11, wherein the operational requirement for power management data packages may comprise an upper size limit for the power management data packages.

Example 13 may be example 11, wherein modifying the power management data package may comprise determining which of the potentially present variable platform devices are actually present and which of the potentially present variable platform devices are not present, in accordance with one or more platform policies.

Example 14 may be example 13, wherein modifying the power management data package may further comprise re-arranging the second plurality of descriptions, such that a first actually present subset of the second plurality of descriptions of the potentially present variable platform devices precedes a second not present subset of the second plurality of descriptions of the potentially present variable platform devices.

Example 15 may be example 14, wherein modifying the power management data package may further comprise calculating a size of the power management data package that includes only the first plurality of descriptions of the always present fixed platform devices, and the first actually present subset of the second plurality of descriptions of the potentially present variable platform devices.

Example 16 may be example 15, wherein modifying the power management data package may further comprise updating a header of the power management data package with the calculated size.

Example 17 may be example 16, wherein modifying the power management data package may further comprise replacing each of the second not present subset of the second plurality of descriptions of the potentially present variable platform devices with a noop opcode.

Example 18 may be any one of examples 11-17, wherein modifying the power management data package may be performed by the firmware during power on self-test, before the power management data package is provided to the operating system.

Example 19 may be any one of examples 11-17, further comprising managing, by a power management service layer of the computing device, power states of various components of the apparatus, wherein the power management service layer may include a power management object having a method that invokes a basic input/output service of the firmware to modify the power management data package during initialization of the power management service layer, before the power management data package is provided to the operating system.

Example 20 may be one or more computer-readable media comprising instructions that cause a computing device, in response to execution of the instructions by a processor of the computing device, to provide basic input/output services to an operating system operated by the processor; wherein the operating system may have an operation requirement of a power management data package; wherein the power management data package initially may include a first plurality of descriptions of always present fixed platform devices and a second plurality of descriptions of potentially present variable platform devices; and wherein provision of basic input/output services may include provision of a service to modify the power management data package to bring the power management data package into compliance with the operational requirement of the operating system.

Example 21 may be example 20, wherein the operational requirement for power management data packages may comprise an upper size limit for the power management data packages.

Example 22 may be example 20, wherein to modify the power management data package may comprise to determine which of the potentially present variable platform devices are actually present and which of the potentially present variable platform devices are not present, in accordance with one or more platform policies.

Example 23 may be example 22, wherein to modify the power management data package may further comprise to re-arrange the second plurality of descriptions, such that a first actually present subset of the second plurality of descriptions of the potentially present variable platform devices precedes a second not present subset of the second plurality of descriptions of the potentially present variable platform devices.

Example 24 may be example 23, wherein to modify the power management data package may further comprise to calculate a size of the power management data package that includes only the first plurality of descriptions of the always present fixed platform devices, and the first actually present subset of the second plurality of descriptions of the potentially present variable platform devices.

Example 25 may be example 24, wherein to modify the power management data package may further comprise to update a header of the power management data package with the calculated size.

Example 26 may be example 25, wherein to modify the power management data package may further comprise to replace each of the second not present subset of the second plurality of descriptions of the potentially present variable platform devices with a noop opcode.

Example 27 may be any one of examples 20-26, wherein the basic input/output services of the firmware may perform the service to modify the power management data package during power on self-test, before the power management data package is provided to the operating system.

Example 28 may be any one of examples 20-26, wherein the computing device may further comprise a power management service layer to be operated by the processor to manage power states of various components of the apparatus, wherein the power management service layer includes a power management object having a method that invokes the service of the basic input/output services to modify the power management data package during initialization of the power management service layer, before the power management data package is provided to the operating system.

Example 29 may be an apparatus for computing, comprising: means for storing a power management data package having a first plurality of descriptions of always present fixed platform devices and a second plurality of descriptions of potentially present variable platform devices, into memory of the computing device; and firmware means for modifying the power management data package to bring the power management data package into compliance with an operational requirement of an operating system of the computing device; and wherein the modified power management data package is provided for use by the operating system.

Example 30 may be example 29, wherein the operational requirement for power management data packages may comprise an upper size limit for the power management data packages.

Example 31 may be example 29, wherein the firmware means for modifying the power management data package may comprise means for determining which of the potentially present variable platform devices are actually present and which of the potentially present variable platform devices are not present, in accordance with one or more platform policies.

Example 32 may be example 31, wherein the firmware means for modifying the power management data package may further comprise means for re-arranging the second plurality of descriptions, such that a first actually present subset of the second plurality of descriptions of the potentially present variable platform devices precedes a second not present subset of the second plurality of descriptions of the potentially present variable platform devices.

Example 33 may be example 32, wherein the firmware means for modifying the power management data package may further comprise means for calculating a size of the power management data package that includes only the first plurality of descriptions of the always present fixed platform devices, and the first actually present subset of the second plurality of descriptions of the potentially present variable platform devices.

Example 34 may be example 33, wherein the firmware means for modifying the power management data package may further comprise means for updating a header of the power management data package with the calculated size.

Example 35 may be example 34, wherein the firmware means for modifying the power management data package may further comprise means for replacing each of the second not present subset of the second plurality of descriptions of the potentially present variable platform devices with a noop opcode.

Example 36 may be any one of examples 29-35, wherein the firmware means for modifying the power management data package may be performed by the firmware during power on self-test, before the power management data package is provided to the operating system.

Example 37 may be any one of examples 29-35, further comprising power management service layer means for managing power states of various components of the apparatus, wherein the power management service layer means includes a power management object having a method that invokes a basic input/output service of the firmware to modify the power management data package during initialization of the power management service layer, before the power management data package is provided to the operating system.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more processors;
memory to store a power management data package having a first plurality of descriptions of always present fixed platform devices and a second plurality of descriptions of potentially present variable platform devices; and
firmware stored in the memory and operated by the one or more processors to provide basic input/output services to an operating system operated by the one or more processors, wherein the operating system has an operational requirement for the power management data package;
wherein the basic input/output services include a service to modify the power management data package to bring the power management data package into compliance with the operational requirement of the operating system.

2. The apparatus of claim 1, wherein the operational requirement for power management data packages comprises an upper size limit for the power management data packages.

3. The apparatus of claim 1, wherein to modify the power management data package comprises to determine which of the potentially present variable platform devices are actually present and which of the potentially present variable platform devices are not present, in accordance with one or more platform policies.

4. The apparatus of claim 3, wherein to modify the power management data package further comprises to re-arrange the second plurality of descriptions, such that a first actually present subset of the second plurality of descriptions of the potentially present variable platform devices precedes a second not present subset of the second plurality of descriptions of the potentially present variable platform devices.

5. The apparatus of claim 4, wherein to modify the power management data package further comprises to calculate a size of the power management data package that includes only the first plurality of descriptions of the always present fixed platform devices, and the first actually present subset of the second plurality of descriptions of the potentially present variable platform devices.

6. The apparatus of claim 5, wherein to modify the power management data package further comprises to update a header of the power management data package with the calculated size.

7. The apparatus of claim 6, wherein to modify the power management data package further comprises to replace each of the second not present subset of the second plurality of descriptions of the potentially present variable platform devices with a noop opcode.

8. The apparatus of claim 1, wherein the basic input/output services of the firmware is to perform the service to modify the power management data package during power on self-test, before the power management data package is provided to the operating system.

9. The apparatus of claim 1, further comprising a power management service layer to be operated by the processor to manage power states of various components of the apparatus, wherein the power management service layer includes a power management object having a method that invokes the service of the basic input/output services to modify the power management data package during initialization of the power management service layer, before the power management data package is provided to the operating system.

10. The apparatus of claim 8, wherein the apparatus is a selected one of a smartphone, a computing tablet, a notebook computer, a laptop computer, an e-book, a game console, a set-top box, or a server.

11. A method for computing, comprising:
storing, by a computing device, a power management data package having a first plurality of descriptions of always present fixed platform devices and a second plurality of descriptions of potentially present variable platform devices, into memory of the computing device;
modifying, by firmware of the computing device, the power management data package to bring the power management data package into compliance with an operational requirement of an operating system of the computing device; and
after the modifying, providing, by the computing device, the power management data package for use by the operating system.

12. The method of claim 11, wherein the operational requirement for power management data packages comprises an upper size limit for the power management data packages.

13. The method of claim 11, wherein modifying the power management data package comprises determining which of the potentially present variable platform devices are actually present and which of the potentially present variable platform devices are not present, in accordance with one or more platform policies.

14. The method of claim 13, wherein modifying the power management data package further comprises re-arranging the second plurality of descriptions, such that a first actually present subset of the second plurality of descriptions of the potentially present variable platform devices precedes a second not present subset of the second plurality of descriptions of the potentially present variable platform devices;
calculating a size of the power management data package that includes only the first plurality of descriptions of the always present fixed platform devices, and the first actually present subset of the second plurality of descriptions of the potentially present variable platform devices;
updating a header of the power management data package with the calculated size; and
replacing each of the second not present subset of the second plurality of descriptions of the potentially present variable platform devices with a noop opcode.

15. The method of claim 11, wherein modifying the power management data package is performed by the firmware during power on self-test, before the power management data package is provided to the operating system.

16. The method of claim 11, further comprising managing, by a power management service layer of the computing device, power states of various components of the apparatus, wherein the power management service layer includes a power management object having a method that invokes a basic input/output service of the firmware to modify the power management data package during initialization of the power management service layer, before the power management data package is provided to the operating system.

17. One or more non-transitory computer-readable media comprising instructions that cause a computing device, in response to execution of the instructions by a processor of the computing device, to provide basic input/output services to an operating system operated by the processor;
wherein the operating system has an operational requirement of a power management data package;
wherein the power management data package initially includes a first plurality of descriptions of always present fixed platform devices and a second plurality of descriptions of potentially present variable platform devices; and
wherein provision of basic input/output services include provision of a service to modify the power management data package to bring the power management data package into compliance with the operational requirement of the operating system.

18. The one or more non-transitory computer-readable media of claim 17, wherein the operational requirement for power management data packages comprises an upper size limit for the power management data packages.

19. The one or more non-transitory computer-readable media of claim 17, wherein to modify the power management data package comprises to determine which of the potentially present variable platform devices are actually present and which of the potentially present variable platform devices are not present, in accordance with one or more platform policies.

20. The one or more non-transitory computer-readable media of claim 19, wherein to modify the power management data package further comprises to re-arrange the second plurality of descriptions, such that a first actually present subset of the second plurality of descriptions of the potentially present variable platform devices precedes a second not present subset of the second plurality of descriptions of the potentially present variable platform devices.

21. The one or more non-transitory computer-readable media of claim 20, wherein to modify the power management data package further comprises to calculate a size of the power management data package that includes only the first plurality of descriptions of the always present fixed platform devices, and the first actually present subset of the second plurality of descriptions of the potentially present variable platform devices.

22. The one or more non-transitory computer-readable media of claim 21, wherein to modify the power management data package further comprises to update a header of the power management data package with the calculated size.

23. The one or more non-transitory computer-readable media of claim 22, wherein to modify the power management data package further comprises to replace each of the second not present subset of the second plurality of descriptions of the potentially present variable platform devices with a noop opcode.

24. The one or more non-transitory computer-readable media of claim 17, wherein the basic input/output services of a firmware is to perform the service to modify the power management data package during power on self-test, before the power management data package is provided to the operating system.

25. The one or more non-transitory computer-readable media of claim 17, wherein the computing device further comprises a power management service layer to be operated by the processor to manage power states of various components of the computing device, wherein the power management service layer includes a power management object having a method that invokes the service of the basic input/output services to modify the power management data package during initialization of the power management service layer, before the power management data package is provided to the operating system.

* * * * *